US011306656B2

(12) United States Patent
Davis et al.

(10) Patent No.: US 11,306,656 B2
(45) Date of Patent: Apr. 19, 2022

(54) OIL DRAINBACK ARRANGEMENT FOR GAS TURBINE ENGINE

(71) Applicant: United Technologies Corporation, Farmington, CT (US)

(72) Inventors: Todd A. Davis, Tolland, CT (US); Reade W. James, West Hartford, CT (US); Peter T. Schutte, Manchester, CT (US); Juan Jimenez, Arecibo, PR (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 218 days.

(21) Appl. No.: 16/662,148

(22) Filed: Oct. 24, 2019

(65) Prior Publication Data

US 2021/0123386 A1    Apr. 29, 2021

(51) Int. Cl.
| | |
|---|---|
| *F02C 7/06* | (2006.01) |
| *F16C 33/66* | (2006.01) |
| *F01D 25/16* | (2006.01) |
| *F16C 33/10* | (2006.01) |
| *F16H 57/04* | (2010.01) |
| *F01D 9/06* | (2006.01) |

(52) U.S. Cl.
CPC ............ *F02C 7/06* (2013.01); *F01D 9/065* (2013.01); *F01D 25/16* (2013.01); *F16C 33/10* (2013.01); *F16C 33/102* (2013.01); *F16C 33/1025* (2013.01); *F16C 33/66* (2013.01); *F16C 33/6637* (2013.01); *F16C 33/6685* (2013.01); *F16H 57/042* (2013.01); *F05D 2220/32* (2013.01); *F05D 2240/50* (2013.01); *F05D 2260/98* (2013.01); *F16C 2360/23* (2013.01)

(58) Field of Classification Search
CPC .... F02C 7/06; F16C 33/6685; F16C 2360/23; F05D 2220/32; F05D 2240/50; F05D 2260/98; F05D 2260/4031; F16H 57/0471; F16H 57/0423; F01D 25/18
USPC ........................................................ 184/6.11
See application file for complete search history.

(56) References Cited

U.S. PATENT DOCUMENTS

| | | | |
|---|---|---|---|
| 9,841,056 B2 * | 12/2017 | Snow .................... | F01D 25/18 |
| 2008/0083227 A1 * | 4/2008 | Eleftheriou ............ | F01D 25/18 60/772 |
| 2011/0138963 A1 | 6/2011 | Pischel | |
| 2016/0053687 A1 | 2/2016 | Tsutsumi et al. | |

(Continued)

FOREIGN PATENT DOCUMENTS

| | | |
|---|---|---|
| DE | 19606088 A1 | 2/1999 |
| EP | 0882175 A1 | 12/1998 |

OTHER PUBLICATIONS

European Search Report for European Patent Application No. 20203942 dated Mar. 1, 2021.

*Primary Examiner* — Yi-Kai Wang

(74) *Attorney, Agent, or Firm* — Carlson, Gaskey & Olds, P.C.

(57) ABSTRACT

A gas turbine engine according to an exemplary aspect of the present disclosure includes, among other things, a passageway configured to permit fluid to drain back into a bearing compartment. The passageway has an inlet outside the bearing compartment and an outlet inside the bearing compartment. The outlet is spaced-apart from a central rotational axis of a towershaft gear.

19 Claims, 3 Drawing Sheets

(56) References Cited

U.S. PATENT DOCUMENTS

2017/0051823 A1  2/2017  Pikovsky et al.
2018/0187770 A1  7/2018  Anglin et al.
2018/0298821 A1  10/2018 Gaulin et al.
2018/0347684 A1  12/2018 Cigal et al.

* cited by examiner

OIL DRAINBACK ARRANGEMENT FOR GAS TURBINE ENGINE

BACKGROUND

A gas turbine engine typically includes a fan section, a compressor section, a combustor section, and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

A gas turbine engine also includes bearings that support rotatable shafts. The bearings require lubricant. The lubricant is held in a bearing compartment containing the bearings.

SUMMARY

A gas turbine engine according to an exemplary aspect of the present disclosure includes, among other things, a passageway configured to permit fluid to drain back into a bearing compartment. The passageway has an inlet outside the bearing compartment and an outlet inside the bearing compartment. The outlet is spaced-apart from a central rotational axis of a towershaft gear.

In a further non-limiting embodiment of the foregoing gas turbine engine, the engine includes a seal configured to contain fluid within the bearing compartment, and the inlet is downstream of the seal.

In a further non-limiting embodiment of any of the foregoing gas turbine engines, the engine includes a gutter arranged adjacent the seal, and the gutter is configured to direct fluid into the inlet.

In a further non-limiting embodiment of any of the foregoing gas turbine engines, the engine includes a rotating fin adjacent the gutter and configured to direct fluid toward the gutter.

In a further non-limiting embodiment of any of the foregoing gas turbine engines, the gutter is substantially U-shaped.

In a further non-limiting embodiment of any of the foregoing gas turbine engines, the passageway is defined at least in part by a conduit having a bore configured to direct fluid to the outlet.

In a further non-limiting embodiment of any of the foregoing gas turbine engines, the conduit is attached to the gutter such that a longitudinal axis of the conduit extends, relative to the a central longitudinal axis of the gas turbine engine, in both a radial direction and a direction normal to the radial direction.

In a further non-limiting embodiment of any of the foregoing gas turbine engines, the conduit includes at least one orifice spaced-apart from a free end of the conduit along the longitudinal axis of the conduit, and the at least one orifice defines the outlet of the passageway.

In a further non-limiting embodiment of any of the foregoing gas turbine engines, the at least one orifice is formed in an outer surface of the conduit.

In a further non-limiting embodiment of any of the foregoing gas turbine engines, the bore does not extend through the entirety of the conduit.

In a further non-limiting embodiment of any of the foregoing gas turbine engines, the gutter includes an orifice, and the conduit is connected to the orifice by a fitting.

In a further non-limiting embodiment of any of the foregoing gas turbine engines, the fitting extends, relative to the engine central longitudinal axis, in a radial direction and is fluidly coupled to the bore of the conduit.

In a further non-limiting embodiment of any of the foregoing gas turbine engines, the outlet is spaced-apart from the central rotational axis by substantially half of a radius of the towershaft gear.

In a further non-limiting embodiment of any of the foregoing gas turbine engines, the towershaft gear is coupled to a towershaft, and the towershaft is configured to drive an external gearbox.

An assembly configured to drain fluid back into a bearing compartment according to an exemplary aspect of the present disclosure includes, among other things, a gutter arranged outside the bearing compartment and including an orifice leading to a passageway, and a conduit attached to the gutter and defining a portion of the passageway including an outlet of the passageway. The conduit is arranged such that the outlet of the passageway is inside the bearing compartment and is spaced-apart from a central rotational axis of a towershaft gear.

In a further non-limiting embodiment of the foregoing assembly, the conduit is mounted to the gutter such that a longitudinal axis of the gutter extends, relative to the a central longitudinal axis of a gas turbine engine, in both a radial direction and a direction normal to the radial direction.

In a further non-limiting embodiment of any of the foregoing assemblies, the conduit includes at least one orifice spaced-apart from a free end of the conduit along the longitudinal axis of the conduit.

In a further non-limiting embodiment of any of the foregoing assemblies, a bore of the conduit does not extend through the entirety of the conduit.

In a further non-limiting embodiment of any of the foregoing assemblies, the gutter includes an orifice, the conduit is connected to the orifice by a fitting, and the fitting extends, relative to the engine central longitudinal axis, in a radial direction. Further, the fitting is fluidly coupled to the conduit.

In a further non-limiting embodiment of any of the foregoing assemblies, the outlet is spaced-apart from the central rotational axis by substantially half of a radius of the towershaft gear.

DETAILED DESCRIPTION

Figure 1:
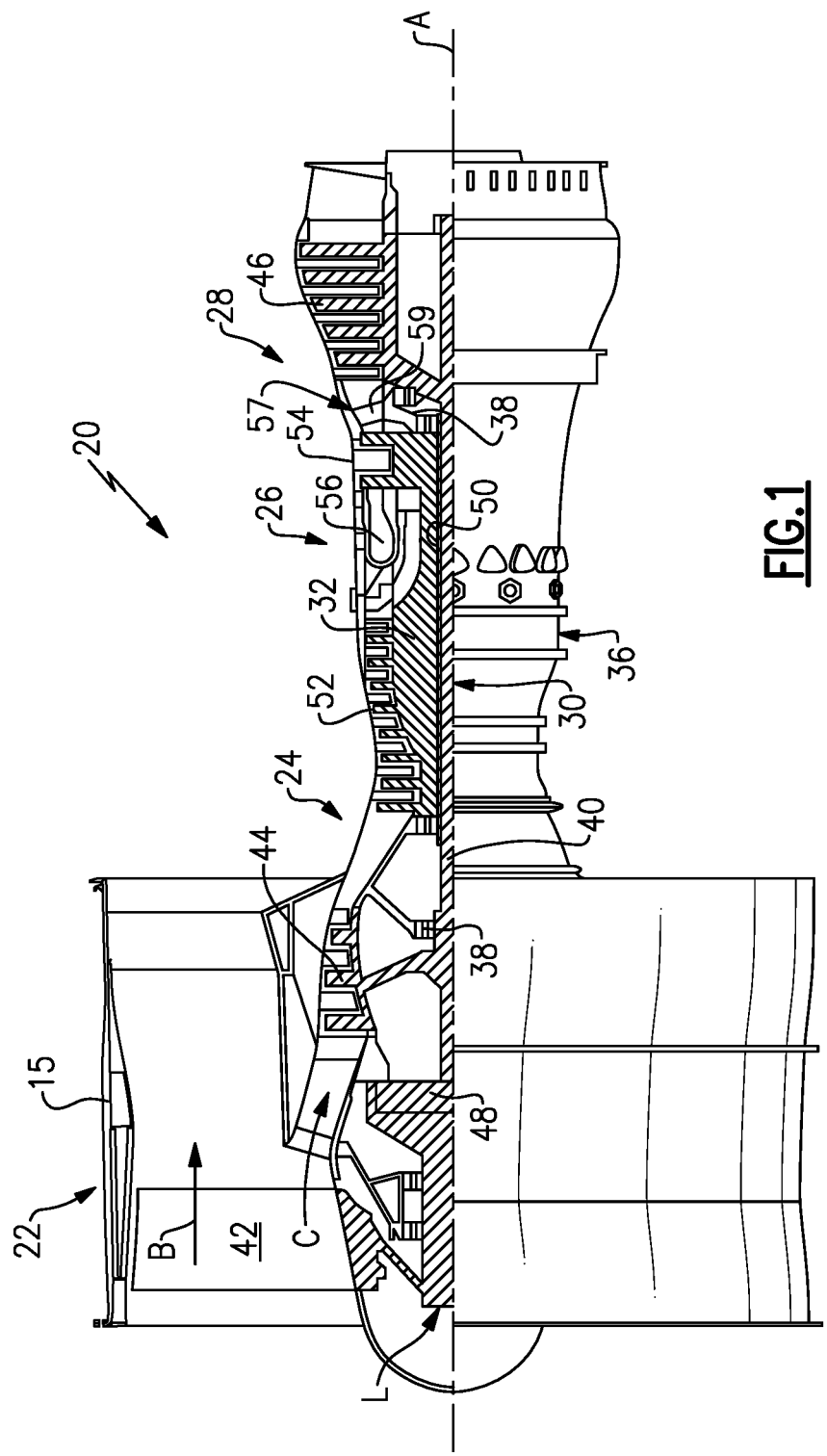
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans, low bypass engines, and multi-stage fan engines.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \ °R)/(518.7° \ R)]^{0.5}$. The "Low corrected fan tip speed" as disclosed herein according to one non-limiting embodiment is less than about 1150 ft/second (350.5 meters/second).

Figure 2:
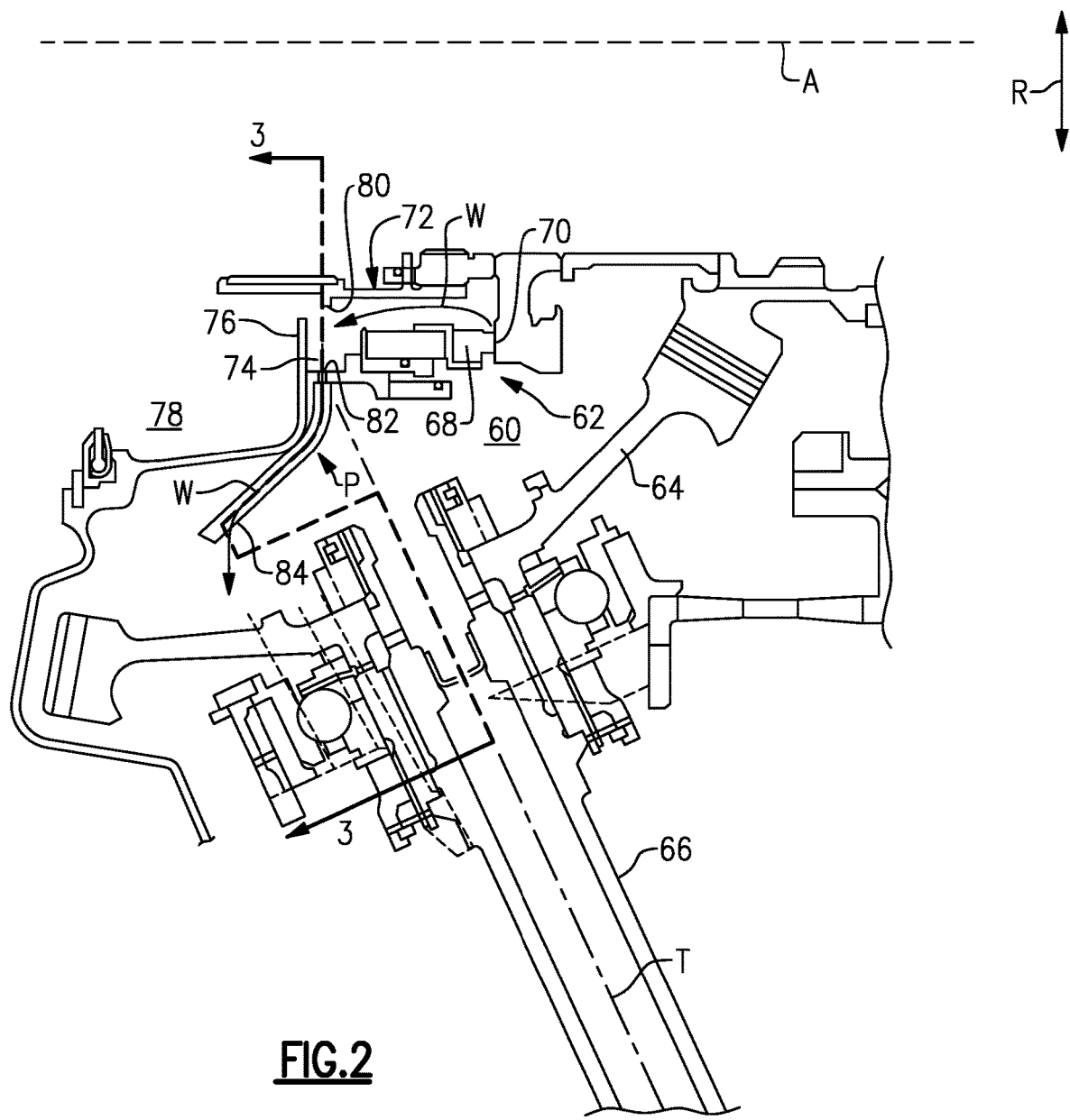
FIG. 2 illustrates a portion of the engine, and in particular illustrates a portion of a bearing compartment and an oil drainback arrangement.

FIG. 2 is a partial cross-sectional view of a portion of the engine 20 including a bearing compartment 60 and an oil drainback arrangement. The bearing compartment 60 includes one or more bearing assemblies and one or more seal assemblies. One seal assembly 62 is shown in FIG. 2 and is configured to seal the bearing compartment 60 and maintain fluid pressure, particularly oil pressure, in the bearing compartment 60 during operation of the engine 20.

The bearing compartment 60 further includes a towershaft gear 64 configured to rotate within the bearing compartment 60 to drive a towershaft 66, which in turn drives a gearbox, such as a gearbox external to the engine 20, for example. The towershaft gear 64 and towershaft 66 are both configured to rotate about a central rotational axis T. The central rotational axis T is non-parallel with the engine central longitudinal axis A. In a particular example, the central rotational axis T is transverse to the engine central longitudinal axis A.

While a particular bearing compartment 60 is shown in FIG. 2, the bearing compartment 60 is representative of any bearing compartment within the engine 20. This disclosure is not limited to any specific bearing compartment, and in particular is not limited to a forward or an aft bearing compartment. This disclosure is not limited to bearing compartments at any particular engine location. Further, this disclosure applies outside the context of bearing compartments, and extends to other engine compartments that are sealed.

The seal assembly 62 includes a carbon seal 68 configured to seal against an adjacent surface 70 to contain fluid, namely oil or an air-oil mixture, within the bearing compartment 60. In some circumstances, a small amount of fluid may exit the bearing compartment 60 by passing between the carbon seal 68 and the surface 70. That small amount of fluid is referred to as wept flow W herein. The term wept flow means fluid leaking in very small amounts, such as not in a steady stream.

Downstream of the carbon seal 68, the wept flow W is configured to flow axially in a direction substantially parallel to the engine central longitudinal axis A, and is radially constrained, in a radial direction R normal to the engine central longitudinal axis A, by the seal assembly 62 on one radial side and a slinger 72 on an opposite radial side of the seal assembly 62. The slinger 72 is configured to rotate about the engine central longitudinal axis A during operation of the engine 20.

A gutter 74 is arranged adjacent the seal assembly 62. The gutter 74 is substantially U-shaped, with the U substantially open toward the engine central longitudinal axis S. The gutter 74 is arranged in a manner that collects the wept flow W. A radially-inwardly (toward the engine central longitudinal axis A) extending wall 76 defines an axial end of the gutter 74. The wall 76 serves to direct the wept flow W toward the gutter 74. An area 78 on an opposite axial side of the wall 76 as the gutter 74 may be pressurized with relatively high pressure air which also serves to direct the wept flow W toward the gutter 74. The slinger 72 also includes a radially-outwardly extending fin 80, which is axially aligned with the gutter 74 and is configured to direct the wept flow W radially outwardly toward the gutter 74. While a particular arrangement configured to collect the wept flow W is discussed herein, this disclosure extends to other arrangements configured to collect wept flow W.

In this disclosure, the wept flow W is directed back into the bearing compartment 60 by a passageway P. The passageway P fluidly couples the gutter 74 to the bearing compartment 60 and is configured to permit the wept flow W to drain back into the bearing compartment 60. Specifically, the passageway P has an inlet 82 outside the bearing compartment 60 and an outlet 84 inside the bearing compartment 60, such that wept flow W can flow along the passageway P to reenter the bearing compartment 60. Further, in this example, the outlet 84 of the passageway P is spaced-apart from the central rotational axis T. This arrangement takes advantage of the low pressure created adjacent the towershaft gear 64, which actively draws any wept flow W into the passageway P and back into the bearing compartment 60.

Figure 3:
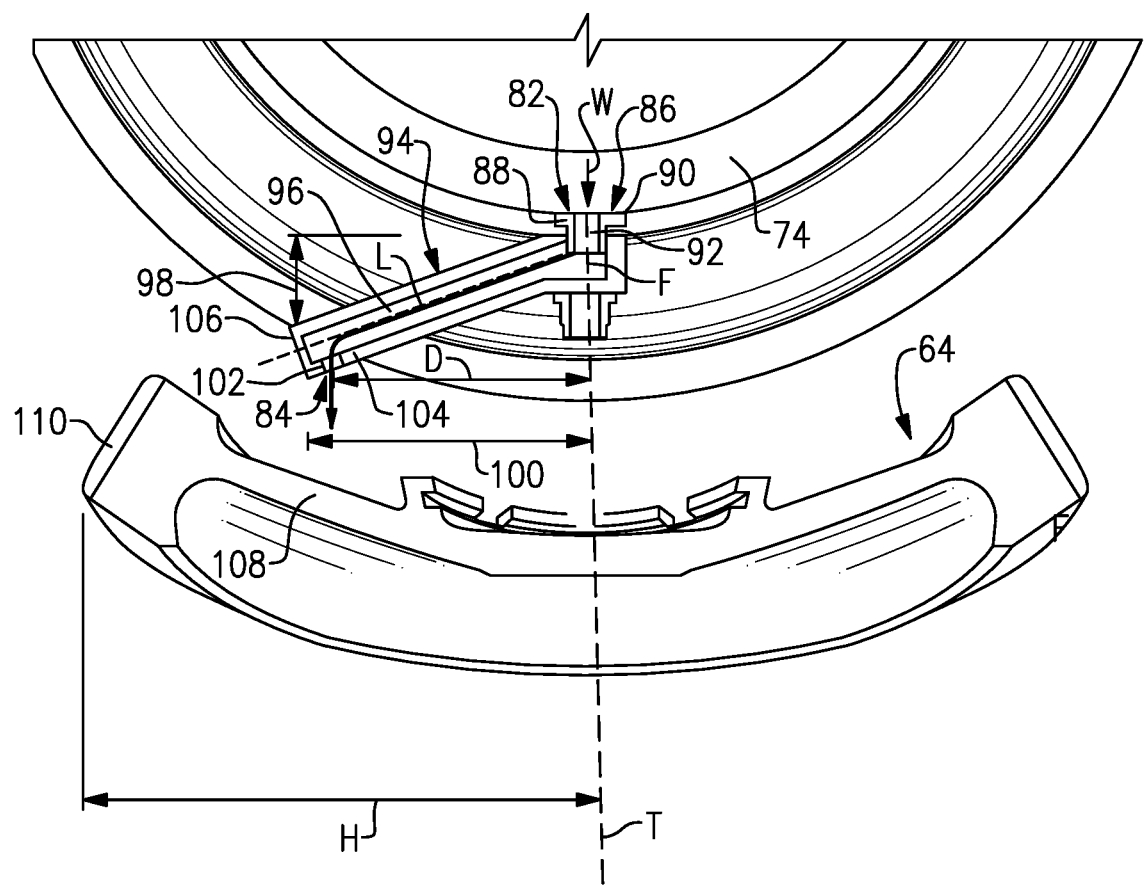
FIG. 3 is a cross-sectional view taken along line 3-3 in FIG. 2 and illustrates a passageway configured to permit oil to reenter the bearing compartment in more detail.

Additional detail of the passageway P will now be described with reference to FIG. 3, which is a cross-sectional view taken along line 3-3 in FIG. 2. Beginning at the inlet 82, the passageway P is defined, in this example, by a fitting 86 having a flange 88 arranged in an orifice 90 of the gutter 74. The fitting 86 includes a central bore 92 extending along an axis F, which is substantially parallel to the radial direction R. After entering the inlet 82, the wept flow W is configured to flow through the central bore 92. Downstream of the fitting 86, the passageway P includes a conduit 94. The conduit 94 includes a central bore 96 and extends along a longitudinal axis L. The bores 92 and 96 are fluidly coupled together. The conduit 94 and fitting 86 may be connected to the gutter 74 using fasteners or by another attachment method, including welding. The fitting 86 and conduit 94 may be separate structures or a one-piece, integrated structure.

The longitudinal axis L of the conduit 94 is inclined such that it extends in a direction defined by two directional components. A first component 98 is a radial component extending in a direction parallel to the radial direction R, and a second component 100 is either extending in a direction normal to the radial direction R, such as a circumferential direction about the engine central longitudinal axis A and/or in an axial direction parallel to the engine central longitudinal axis A.

The conduit 94 is arranged such that it extends away from the axis F at a non-90° angle. Further, in this example, the conduit 94 includes at least one orifice 102 defining the outlet 84 of the passageway P. The orifice 102 is formed in an outer surface 104 of the conduit 94. In this example, the orifice 102 is formed in a side of the conduit 94 facing toward the towershaft gear 64. In particular, the orifice 102 is on a radially outer side of the conduit 94 relative to the engine central longitudinal axis A. Further, in this example, the bore 96 does not extend through the entirety of the conduit 94. Rather, a free end 106 of the conduit 94 is closed and is configured to turn fluid toward the orifice 102. The orifice 102 is spaced-apart from the free end 106 relative to the longitudinal axis L.

The conduit 94 is arranged such that the orifice 102 is axially aligned, relative to the engine central longitudinal axis A, with a portion of the towershaft gear 64 spaced-apart from the central rotational axis T. In this example, the orifice 102 is spaced-apart from the central rotational axis T by an amount D substantially equal to substantially half a radius H of the towershaft gear 64. The amount D is measured in a direction normal to the central rotational axis T. The radius H, in this example, extends from the central rotational axis T to the outer circumference of the towershaft gear 64. In other examples, the orifice 102 could be aligned with the towershaft gear 64 at any point along a hub 108 of the towershaft gear 64, and in particular at points along the hub 108 and adjacent the gear teeth 110 of the towershaft gear 64. At such locations, rotation of the towershaft gear 64 creates a low pressure zone which draws the wept flow W into the passageway P and back into the bearing compartment 60, where it is recirculated within the bearing compartment 60.

It should be understood that except where otherwise noted, terms such as "axial," "radial," and "circumferential" are used above with reference to the normal operational attitude of the engine 20. Further, these terms have been used herein for purposes of explanation, and should not be considered otherwise limiting. Terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A gas turbine engine, comprising:
a passageway configured to permit fluid to drain back into a bearing compartment, the passageway having an inlet outside the bearing compartment and an outlet inside the bearing compartment, wherein the outlet is spaced-apart from a central rotational axis of a towershaft gear;
a seal configured to contain fluid within the bearing compartment, wherein the inlet is downstream of the seal; and
a gutter arranged adjacent the seal, wherein the gutter is configured to direct fluid into the inlet, wherein the gutter is substantially U-shaped and the gutter is arranged such that the substantial U-shape is open facing toward a central longitudinal axis of the gas turbine engine.

2. The gas turbine engine as recited in claim 1, further comprising a fin adjacent the gutter and configured to direct fluid toward the gutter, wherein the fin is configured to rotate relative to the gutter during operation of the gas turbine engine, wherein the gutter is arranged such that substantial U-shape of the gutter is open in a direction facing toward the fin.

3. The gas turbine engine as recited in claim 1, wherein the passageway is defined at least in part by a conduit having a bore configured to direct fluid to the outlet.

4. The gas turbine engine as recited in claim 3, wherein the conduit is attached to the gutter such that a longitudinal axis of the conduit extends, relative to a central longitudinal axis of the gas turbine engine, in both a radial direction and a direction normal to the radial direction.

5. The gas turbine engine as recited in claim 4, wherein:
the conduit includes at least one orifice spaced-apart from a free end of the conduit along the longitudinal axis of the conduit, and
the at least one orifice defines the outlet of the passageway.

6. The gas turbine engine as recited in claim 5, wherein the at least one orifice is formed in an outer surface of the conduit.

7. The gas turbine engine as recited in claim 5, wherein the bore does not extend through the entirety of the conduit.

8. The gas turbine engine as recited in claim 4, wherein the gutter includes an orifice, and the conduit is connected to the orifice by a fitting.

9. The gas turbine engine as recited in claim 8, wherein the fitting extends, relative to the engine central longitudinal axis, in a radial direction and is fluidly coupled to the bore of the conduit.

10. The gas turbine engine as recited in claim 2, wherein the outlet is spaced-apart from the central rotational axis by substantially half of a radius of the towershaft gear.

11. The gas turbine engine as recited in claim 1, wherein the towershaft gear is coupled to a towershaft, and the towershaft is configured to drive an external gearbox.

12. An assembly configured to drain fluid back into a bearing compartment, comprising:
a gutter arranged outside the bearing compartment and including an orifice leading to a passageway; and
a conduit attached to the gutter and defining a portion of the passageway including an outlet of the passageway, wherein the conduit is arranged such that the outlet of the passageway is inside the bearing compartment and is spaced-apart from a central rotational axis of a towershaft gear, wherein the gutter is substantially U-shaped and the gutter is arranged such that the substantial U-shape is open facing away from the conduit.

13. The assembly as recited in claim 12, wherein the conduit is mounted to the gutter such that a longitudinal axis of the gutter extends, relative to a central longitudinal axis of a gas turbine engine, in both a radial direction and a direction normal to the radial direction.

14. The assembly as recited in claim 13, wherein the conduit includes at least one orifice spaced-apart from a free end of the conduit along the longitudinal axis of the conduit.

15. The assembly as recited in claim 14, wherein a bore of the conduit does not extend through the entirety of the conduit.

16. The assembly as recited in claim 14, wherein:
the gutter includes an orifice,
the conduit is connected to the orifice by a fitting,
the fitting extends, relative to the engine central longitudinal axis, in a radial direction, and
the fitting is fluidly coupled to the conduit.

17. The assembly as recited in claim 12, wherein the outlet is spaced-apart from the central rotational axis by substantially half of a radius of the towershaft gear.

18. The gas turbine engine as recited in claim 1, wherein the gutter is substantially U-shaped in cross-section.

19. The gas turbine engine as recited in claim 1, wherein the gutter extends circumferentially about an entirety of the engine central longitudinal axis.

* * * * *